United States Patent
Carrington

(10) Patent No.: US 12,469,278 B2
(45) Date of Patent: *Nov. 11, 2025

(54) GEOREFERENCING A GENERATED FLOORPLAN AND GENERATING STRUCTURAL MODELS

(71) Applicant: Charles C. Carrington, Cocoa, FL (US)

(72) Inventor: Charles C. Carrington, Cocoa, FL (US)

( * ) Notice: Subject to any disclaimer, the term of this patent is extended or adjusted under 35 U.S.C. 154(b) by 291 days.

This patent is subject to a terminal disclaimer.

(21) Appl. No.: 18/172,095

(22) Filed: Feb. 21, 2023

(65) Prior Publication Data

US 2023/0351742 A1 Nov. 2, 2023

Related U.S. Application Data

(63) Continuation of application No. 17/229,305, filed on Apr. 13, 2021, now Pat. No. 11,615,588.

(Continued)

(51) Int. Cl.
*G06T 17/00* (2006.01)
*G06V 10/44* (2022.01)
(Continued)

(52) U.S. Cl.
CPC ............ *G06V 20/176* (2022.01); *G06T 17/00* (2013.01); *G06V 10/44* (2022.01); *G06V 10/752* (2022.01);

(Continued)

(58) Field of Classification Search
CPC .... G06V 20/176; G06V 10/44; G06V 10/752; G06V 20/64; G06V 30/422; G06T 17/00; G06T 2210/04

See application file for complete search history.

(56) References Cited

U.S. PATENT DOCUMENTS 7,324,102 B2 * 1/2008 Inzinga ................... G06T 17/20
                                                    700/98
7,509,241 B2 * 3/2009 Guo ......................... G06T 17/10
                                                    703/2

(Continued)

OTHER PUBLICATIONS

Zhu et al., An Economical Approach to Geo-Referencing 3D Model for Integration of BIM and GIS, 2017 (Year: 2017).*

(Continued)

*Primary Examiner* — Phong X Nguyen
(74) *Attorney, Agent, or Firm* — Norton Rose Fulbright US LLP

(57) ABSTRACT

Methods and systems for improved generation and georeferencing of floor plans are presented. In one embodiment, a method is presented that includes receiving images that depict sheets of a blueprint of a structure. Subsets of the images depicting floor sheets and elevation sheets may be identified. Exterior contours may be extracted from the images depicting floor sheets and elevation contours may be extracted from the images depicting elevation sheets. A corresponding structure within a three-dimensional map may be identified based on the exterior contours and the elevation contours. A three-dimensional contour of the exterior of the structure may be extracted from the three-dimensional map.

20 Claims, 9 Drawing Sheets

Related U.S. Application Data

(60) Provisional application No. 63/009,111, filed on Apr. 13, 2020.

(51) Int. Cl.
  *G06V 10/75* (2022.01)
  *G06V 20/10* (2022.01)
  *G06V 20/64* (2022.01)
  *G06V 30/422* (2022.01)

(52) U.S. Cl.
  CPC ............ *G06V 20/64* (2022.01); *G06V 30/422* (2022.01); *G06T 2210/04* (2013.01)

(56) References Cited

U.S. PATENT DOCUMENTS

| | | | |
|---|---|---|---|
| 8,990,049 B2* | 3/2015 | Plocher | G06F 30/13 703/1 |
| 9,600,544 B2* | 3/2017 | Snellman | G06F 16/248 |
| 9,600,930 B2* | 3/2017 | Chen | G09B 29/005 |
| 9,684,643 B2* | 6/2017 | Chegini | G06F 3/0482 |
| 10,636,207 B1 | 4/2020 | Swidersky et al. | |
| 10,740,965 B2* | 8/2020 | Young | G06T 19/20 |
| 11,068,739 B1 | 7/2021 | Ducrocq | |
| 11,288,413 B2 | 3/2022 | Xie et al. | |
| 11,373,021 B2 | 6/2022 | Semba et al. | |
| 2008/0016145 A1* | 1/2008 | Takase | G09B 29/007 709/201 |
| 2011/0205228 A1* | 8/2011 | Peter | G06T 19/00 345/427 |
| 2011/0270584 A1* | 11/2011 | Plocher | G06F 30/13 703/1 |
| 2012/0183204 A1 | 7/2012 | Aarts et al. | |
| 2013/0321392 A1* | 12/2013 | van der Merwe | G06V 20/176 345/419 |
| 2013/0321398 A1* | 12/2013 | Howard | G06T 19/20 345/419 |
| 2014/0267717 A1* | 9/2014 | Pitzer | G01C 15/002 703/1 |
| 2014/0280039 A1* | 9/2014 | Bach | G01C 21/3611 707/722 |
| 2015/0187130 A1* | 7/2015 | Guskov | G06T 17/20 345/643 |
| 2015/0199557 A1 | 7/2015 | Zhang et al. | |
| 2015/0221128 A1 | 8/2015 | Bhatawadekar et al. | |
| 2015/0227644 A1* | 8/2015 | Schultz | G01C 15/002 703/1 |
| 2016/0049064 A1 | 2/2016 | McNabb et al. | |
| 2016/0063722 A1 | 3/2016 | Allred et al. | |
| 2018/0032643 A1 | 2/2018 | Wright et al. | |
| 2018/0114361 A1 | 4/2018 | Carrington | |
| 2019/0251209 A1* | 8/2019 | Xie | G06T 17/00 |
| 2020/0116493 A1 | 4/2020 | Colburn et al. | |
| 2020/0126306 A1 | 4/2020 | Aguoridis | |
| 2020/0175753 A1 | 6/2020 | Bae et al. | |
| 2021/0073449 A1 | 3/2021 | Segev et al. | |
| 2021/0117071 A1 | 4/2021 | Gharpuray | |
| 2021/0343032 A1 | 11/2021 | Hoiem et al. | |
| 2021/0343073 A1 | 11/2021 | Carrington | |
| 2022/0003555 A1 | 1/2022 | Colburn et al. | |
| 2022/0164493 A1 | 5/2022 | Li et al. | |

OTHER PUBLICATIONS

Diakite et al., Automatic geo-referencing of BIM in GIS environments using building footprints, 2019 (Year: 2019).*

A new 3D indoor/outdoor spatial model for indoor emergency response facilitation, Tashakkori et al., 2015.

Chu Hang et al: "HouseCraft: Building Houses from Rental Ads and Street Views", Sep. 17, 2016 (Sep. 17, 2016), Advances in Intelligent Data Analysis IXI; [Lecture Notes in Computer Science; Lect. Notes Computer], Springer Internaional Publishing, Cham, pp. 500-516, XP047565734, ISSN: 0302-9743; ISBN:978-3-030-71592-2 [retrieved on Sep. 17, 2016].

Highly Automatic Approach to Architectural Floorplan Image Understanding & Model Generation, Or et al., 2005.

HouseCraft: Building Houses from Rental Ads and Street Views, Chu et al., 2016.

International Search Report and Written Opinion for Application No. PCT/US2021/027086 mailed Sep. 7, 2021 (20 pages).

Review: reconstruction of 3D building information models from 2D scanned plans, Gimenez et al., 2015.

Visualization and Communication Tool for Emergency Response, Gelernter et al., 2018.

* cited by examiner

GEOREFERENCING A GENERATED FLOORPLAN AND GENERATING STRUCTURAL MODELS

CROSS-REFERENCE TO RELATED APPLICATIONS

The present application claims priority to U.S. patent application Ser. No. 17/229,305, filed Apr. 13, 2021, which claims priority to U.S. Provisional Patent Application No. 63/009,111 filed Apr. 13, 2020, the disclosure of each of which is incorporated herein by reference for all purposes.

BACKGROUND

Blueprints are available for many buildings and may be used to better understand the layout of the buildings. For example, scanned copies for the blueprints of many buildings are publicly available. Such blueprints may include indications of various features of the building, including floor plans, plumbing arrangements, security system arrangements, electrical connections, and other fixtures within the buildings.

SUMMARY

The present disclosure presents new and innovative systems and methods for generating and georeferencing floor plans of structures. In a first aspect, a method is provided that includes receiving a plurality of images depicting sheets of a blueprint of a structure and identifying a first subset of the plurality of images that depict floor sheets of the structure and a second subset of the plurality of images that depict elevation sheets of the structure. Exterior contours of the floors of the structure may be extracted from the first subset of the plurality of images. Elevation contours of the structure may be extracted from the second subset of the plurality of images. The method may further include identifying, based on the exterior contours and the elevation contours, a corresponding structure in a three-dimensional map of an area surrounding the structure and extracting, from the three-dimensional map, a three-dimensional contour of the exterior of the structure.

In a second aspect according to the first aspect, extracting the exterior contours of the floors of the structure further includes identifying, for each of the first subset of the plurality of images, interior contours of one or more designated features of the structure and determining the exterior contours of the floors as a minimum bounding box that encompasses the interior contours.

In a third aspect according to the second aspect, the one or more designated features include at least one feature selected from the group consisting of (i) interior walls of the structure, (ii) exterior walls of the structure, (iii) stairwells within the structure, and (iv) elevator shafts within the structure.

In a fourth aspect according to any of the second and third aspects, the method further includes aligning the exterior contours at least in part based on the interior contours.

In a fifth aspect according to any of the first through fourth aspects, the first subset of the plurality of images are raster images and wherein the method further comprises generating a plurality of dynamic images based on the first subset of the plurality of images.

In a sixth aspect according to the fifth aspect, generating the plurality of dynamic images includes classifying a plurality of pixels within each of the first subset of the plurality of images as indicating the exterior contours and connecting the plurality of pixels to generate the plurality of dynamic images.

In a seventh aspect according to any of the fifth and sixth aspects, the method further includes associating the plurality of dynamic images with the three-dimensional contour of the exterior of the structure.

In an eighth aspect according to any of the fifth through seventh aspects, the method further includes extruding one or more features between the plurality of dynamic images to generate a three-dimensional representation of a plurality of floors of the structure.

In a ninth aspect according to any of the fifth through eighth aspects, the method further includes comprising extracting first coordinates of the structure from the three-dimensional map.

In a tenth aspect according to the ninth aspect, the method further includes determining second coordinates for at least a portion of the plurality of dynamic images based on the first coordinates.

In an eleventh aspect according to the tenth aspect, the method further includes identifying a third subset of the plurality of images that depict site plans of the structure, wherein the second coordinates are determined at least in part based on the site plans of the structure.

In a twelfth aspect according to any of the tenth and eleventh aspects, the first coordinates are georeferenced coordinates and wherein the second coordinates are determined in a local frame of reference for the structure.

In a thirteenth aspect according to any of the first through twelfth aspects, the three-dimensional map includes a plurality of pixels associated with a set of georeferenced coordinates.

In a fourteenth aspect according to any of the first through thirteenth aspects, the first subset of the plurality of images and the second subset of the plurality of images are identified using a classifier model.

In a fifteenth aspect according to any of the first through fourteenth aspects, the area of the three-dimensional map is selected at least in part based on an address of the structure.

In a sixteenth aspect, a method is provided that includes receiving a plurality of images depicting sheets of a blueprint of a structure and identifying a first subset of the plurality of images that depict floor sheets of the structure and a second subset of the plurality of images that depict elevation sheets of the structure. The method may also include identifying, within the floor sheets and the elevation sheets, a structural assembly for the building and identifying a base material for the structural assembly. The method may further include determining structural characteristics for the structural assembly and adding the structural assembly to a three-dimensional structural model of the structure. Structural characteristics may be assigned to the structural assembly within the structural model.

In a seventeenth aspect according to the first aspect, determining structural properties for the structural assembly includes identifying, within the floor sheets and the elevation sheets, physical dimensions of the structural assembly and a base material for the structural assembly and identifying structural properties for the base material. The method may further include determining the structural characteristics for the structural assembly based on the structural properties for the base material and the physical dimensions of the structural assembly.

In an eighteenth aspect according to any of the first and seventeenth aspects, the structural assembly is a wall portion of the building and the base material includes a wall assembly for the wall portion.

In a nineteenth aspect according to any of first through eighteenth aspects, the structural assembly is a floor portion for the building and the base material includes a floor assembly for the floor portion.

In a twentieth aspect according to any of the first through nineteenth aspects, the structural model is used for at least one of building destruction simulation, building fire simulation, performance contracting, and building inspections.

The features and advantages described herein are not all-inclusive and, in particular, many additional features and advantages will be apparent to one of ordinary skill in the art in view of the figures and description. Moreover, it should be noted that the language used in the specification has been principally selected for readability and instructional purposes, and not to limit the scope of the disclosed subject matter.

DETAILED DESCRIPTION OF EXAMPLE EMBODIMENTS

Figure 1:
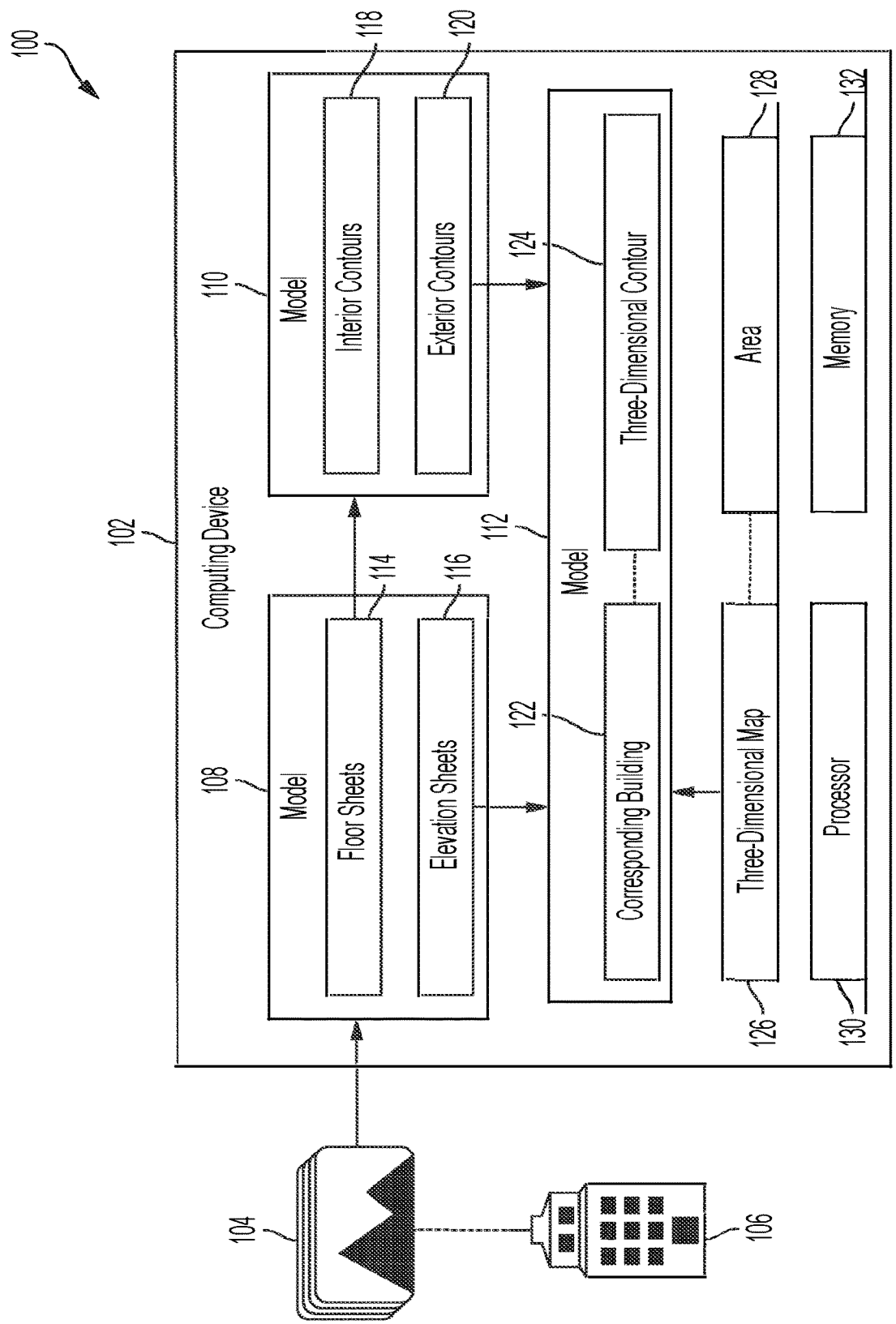
FIG. 1 illustrates a system according to an exemplary embodiment of the present disclosure.

Blueprints may be received as scanned images of the original blueprint document. These scanned images are typically stored in the form of raster images (e.g., images with a fixed resolution). Such scanned images are difficult to use when attempting to quickly determine the layout of a building. For example, blueprints typically include many types of sheets depicting different aspects of the building. Floor sheets may depict details regarding the precise layout and/or positioning of individual floors of the building. Elevation sheets may depict exterior views of the building from various sides. Other sheets may depict further details, such as landscaping, parking lots, storage areas, and/or other aspects of the building. As another example, for blueprints stored as raster images, when zoomed in to view particular details, the images may become blurry and unclear.

In certain instances, it may be necessary to quickly ascertain the layout of a building. For example, in emergency scenarios such as situations involving first responders (e.g., firefighters, police officers, military personnel), the first responders may need to quickly determine the layout of the building in order to best address the emergency situation. For example, the first responders may need to determine the layout of walls, stairwells, elevator banks, and/or other fixtures within the building to best plan a safe and effective entry and path of travel within the building. As explained above, the many different types of sheets included within the blueprints of the building may render it cumbersome to quickly analyze the blueprints themselves and determine the layout of the building. Additionally, the sheets themselves may be difficult to quickly parse visually. For example, the same floor sheet may include information regarding the layout of walls, stairwells, and/or elevator banks alongside information for other building systems, including plumbing systems, security systems, electrical systems, HVAC systems, and/or various fixtures (e.g., plumbing fixtures, furniture). Furthermore, even where blueprints are received in other formats (e.g., computer-aided design (CAD) or geographic information system (GIS) formats), the inclusion of such details may be difficult to visually parse. Accordingly, first responders may be unable to analyze the blueprints themselves to determine the layout of the building quickly before entering the building. Additionally, the blueprints may typically not include coordinate information for specific features (e.g., designated features) of the various floors of a building. Therefore, a user's current location coordinates (e.g., as received from a GPS or other type of location sensor located on a helmet vest or other piece of equipment, such as a Blue Force 6 sensor) may not be quickly compared to the floor plans indicated within the blueprints to determine where the user is within the building. Such shortcomings may prevent the blueprints from being usable to monitor the locations of first responders within the building. In certain instances, scanned building information (e.g., three-dimensional scans of the building) may be combined with other building data to identify floor plans corresponding to a particular building. Such techniques are further discussed in U.S. Pat. No. 10,354,439. However, such techniques rely on external scanners, which may be cumbersome, unavailable, or may incur processing delays to perform the scans themselves. Therefore, there exists a need to process blueprints to extract the relevant information for quickly parsing the layout of a building while also determining location coordinates for the details of the layout of the building.

One solution to this problem is to analyze the scanned images of the blueprints to identify which images depict floor sheets and elevation sheets of the building. Such analyses may be performed by a machine learning model, such as a classifier model. The images of the floor sheets may be further analyzed to extract exterior contours of the floors of the building. A georeferenced three-dimensional map (e.g., a map storing three-dimensional coordinates in association with visual information and location information for the coordinates) of an area surrounding the building may then be analyzed for a building that corresponds to the building depicted in the blueprints. For example, the corresponding building may be identified based on the exterior contours of the floors of the building and the elevation sheets of the building. In particular, a machine learning model may be trained to analyze the three-dimensional map and identify the corresponding building. A three-dimensional contour of the building (e.g., of the exterior of the building) may be extracted from the three-dimensional map. The three-dimensional contour may then be used to georeference the features of the building. For example, one or more coordinates associated with the corresponding building and/or the three-dimensional contour may be used to determine location coordinates for the features of the building.

FIG. 1 illustrates a system 100 according to an exemplary embodiment of the present disclosure. The system 100 may be configured to receive and analyze images of blueprints to identify one or more features of structures that correspond to the blueprints and to determine location coordinates for the features based on a corresponding building in a three-dimensional map. The system 100 includes a computing device 102. The computing device 102 may be configured to receive images 104. The images 104 may depict sheets of one or more blueprints corresponding to a building 106. For example, the images 104 may depict one or more floor sheets, elevation sheets, site plans, and other types of sheets (e.g., sheets depicting landscaping, etc.). The computing device 102 may receive the images 104 from a database, such as a public repository of building plans and/or blueprints. Additionally or alternatively, the images 104 may be received from a scanner that has scanned a hard copy of the blueprints to generate the images 104. In certain instances, the images 104 may include multiple versions of blueprints for the same building. For example, a building 106 may have been renovated to change the interior layout of at least a portion of the building 106 and the images 104 may include images of a blueprint of the building's 106 initial layout and updated blueprints of at least a portion of the building 106 that is renovated. Although identified as a building 106, in practice the building may include any type of structure (e.g., man-made structure). For example, the building 106 may include any structure with an interior space that is at least partially enclosed. As a specific example, the structure may include single-story buildings, multi-story building, warehouse structures, infrastructure facilities, outdoor structures (e.g., pavilions, gazebos, decks, bridges, dams), or combinations thereof. As a further example, infrastructure facilities may include interior and exterior structures of dams, storm water pipes, sewer pipes, tunnels (e.g., access tunnels, tunnels for automobiles), channels, utility stations (e.g., pump stations), conduits (e.g., electrical conduits), and the like. Accordingly, any reference to buildings herein should be understood to apply similarly to any type of structure.

The images 104 may be received by a model 108. The model 108 may be trained to analyze the images 104 and identify images depicting floor sheets 114 and elevation sheets 116 of the blueprints. For example, the model 108 may be a classifier model, such as a convolutional neural network, trained to classify each of the images as depicting a floor sheet 114, depicting an elevation sheet 116, depicting a site plan, or not being relevant to further analysis. For example, the model 108 may be trained on a training data sets containing labeled images of floor sheets, elevation sheets, site plans, and other types of sheets. Based on the training, the model may analyze the received images 104 to identify the floor sheets 114 and the elevation sheets 116.

The floor sheets 114 may be provided to a further model 110. The model 110 may be configured to analyze particular types of sheets (e.g., floor sheets 114) to identify interior contours 118 and exterior contours 120 of floors within the building based on the floor sheets. For example, the interior contours 118 may be identified around one or more predetermined fixtures within the floor. For example, interior contours 118 may be identified around stairwells, elevator banks, interior walls, corners, structural components (e.g., support pillars, support beams), ingress and egress locations (e.g., doors, windows), utility systems (e.g., components of mechanical, electrical, and HVAC systems), hazardous material locations, security systems, and/or other features of the floor. The model 110 may additionally be trained to identify the interior contours 118 based on the desired interior features. In certain implementations, the model 110 may be implemented as one or more machine learning models (e.g., machine learning model object detection system). In particular, the model 110 may include one or more convolutional neural network (CNN) models (e.g., Mask R-CNN models, ResNet101 CNN models, and/or Single Shot Multibox Detector (SSD) models) trained to identify interior contours 118 around particular types of features. In particular, SSD models may be used to identify features that are long and thin, such as walls, doors, windows, and the like. In certain instances, the model 110 may be configured to identify pixels within the images of floor sheets that correspond to the interior contours 118 and the exterior contours 120. For example, the machine learning model may be trained to identify pixels corresponding to features such as interior walls, exterior walls, windows, doors, stairwells, and elevator shafts within the floor sheets 114. The pixels may then be connected to generate the interior contours 118. In certain instances, the machine learning models may be trained to identify the interior contours 118 using other types of machine learning models. For example, the one or more machine learning models may additionally or alternatively be implemented as one or more of a recurrent neural network, a deep learning model, and/or any other type of machine learning model. In certain instances, the exterior contours 120 may be determined based on the interior contours 118. For example, the exterior contours 120 may be identified to encompass the exterior walls of the building encompassing each floor of the building. In certain instances, the model 110 may be trained to identify the exterior contours 120 based on a minimum bounding box required to encompass the interior contours 118 of the floor within the floor sheet 114. In certain implementations, a model similar to the model 110 may be used to identify elevations within the elevation sheets 116.

In certain implementations, the interior contours 118 and the exterior contours 120 may be generated as dynamic images. For example, the interior contours 118 may be identified as outlines (e.g., two-dimensional outlines) of the desired features within the floors and the exterior contours 120 may be identified as outlines (e.g., two-dimensional outlines) of the exterior walls of the floors of the building. The outlines corresponding to the interior contours 118 and the exterior contours 120 may be stored as vectors or other resolution-independent formats (e.g., CAD format, GIS format). In particular, the outlines may be created by connecting pixels in a resolution-independent manner (e.g., using vector lines) classified by the model 110 as corresponding to particular features. Further, in certain implementations, the interior contours 118 and/or the exterior contours 120 may be extruded to form a three-dimensional representation of the floor and/or the building 106. For example, the exterior contours 120 may be extruded to generate a three-dimensional representation of the exterior of the building 106 and the interior contours 118 may be extruded to generate a three-dimensional representation of the interior of the building 106. In certain implementations, the three-dimensional representation of the exterior and/or of the building 106 may be stored in CAD and/or GIS formats. In further implementations, the dynamic images may be editable or adjustable using editing tools (e.g., CAD, GIS, or vector image editing tools).

The exterior contours 120 and elevation sheets 116 (and/or exterior contours of the elevation sheets 116) may be provided to a third model 112. The model 112 may also receive a three-dimensional map 126. The three-dimensional map 126 may depict an area 128 surrounding the building 106. For example, the three-dimensional map 126 may be identified to include an area 128 surrounding an address of the building 106 (e.g., within a predetermined distance of the address) or a current location of a user (e.g., a requesting analysis of the blueprints). In certain instances, the three-dimensional map 126 may depict a region, such as at least a portion of a town or a city. In certain implementations, the area 128 may be determined based on user input (e.g., an approximate location for the building 106, the user's current location, a portion of a city to search for corresponding buildings). In such instances, more accurate provided locations (e.g., smaller areas 128) received from a user may enable faster review. In certain implementations, areas 128 containing 250 or fewer building may be desirable to enable suitably quick processing times (e.g., on the order of several minutes). The three-dimensional map 126, as explained further below, may include three-dimensional information for the area surrounding the building 106. In particular, the three-dimensional map 126 may include altitude and/or terrain information for roads, walkways, and other spaces surrounding the building 106, along with three-dimensional contour of the building 106 and surrounding buildings. For example, the three-dimensional map 126 may be implemented at least in part based on georeferenced overhead three-dimensional imagery (e.g., satellite imagery, manned/unmanned aerial vehicle imagery, drone imagery, or any other three-dimensional imagery). As a specific example, the three-dimensional map 126 may be generated based on stereo pairs and/or specialized cameras configured to capture three-dimensional information in addition to visual information (e.g., using LIDAR or photogrammetry sensors). As another example, the three-dimensional map 126 may be generated at least in part based on In certain instances, the three-dimensional map 126 may combine pixels with associated location coordinates (e.g., georeferenced coordinates). In further instances, the three-dimensional map 126 may be stored as a digital elevation model (DEM) and/or as a digital surface model (DSM). Additionally or alternatively, the three-dimensional map 126 may include orthorectified imagery (e.g., to correct for the perspective and/or visual distortions caused by lenses).

The model 112 may be configured to identify a corresponding building 122 within the three-dimensional map 126. For example, the model 112 may be configured to analyze the contours of buildings or structures within the three-dimensional map 126 to find a corresponding building 122 with a similar contour. In particular, the model 112 may compare the exterior contours 120 and/or the elevation sheets 116 to the contours of buildings located within the three-dimensional map 126 to identify a corresponding building 122 with contours similar to the exterior contours 120 and/or the elevation sheets 116. For example, the model 112 may be implemented as a machine learning model trained on a training data set including exterior contours and elevation sheets of buildings, along with an indication of the correct corresponding building. In additional or alternative implementations, the model 112 may be implemented as a statistical model. For example, the statistical model may apply one or more transformations (e.g., spatial transformations) to the exterior contours 120 and the elevation sheets (e.g., elevation contours of the elevation sheets). In particular, the transformation may generate one or more combinations of the exterior contours 120 and the elevation contours that combine to form a potential building structure corresponding to the building 106. The transformed exterior contours and elevation sheets may then be compared, individually or in combination, to three-dimensional contours of buildings within the three-dimensional map 126. The transformed exterior contours and elevation sheets may be scored based on how closely the transformed exterior contours and elevation sheets match the three contours of the building, and the corresponding building 122 may be identified as the building within the three-dimensional map 126 with the highest score (e.g., that most closely resembles the transformed exterior contours and elevation sheets). In certain instances, the above process may be repeated with different combinations and/or transformations and the corresponding building 122 may be identified as the building with the highest score between the different combinations of transformations. In certain implementations, the model 112 may additionally receive the interior contours 118. For example, certain interior contours (e.g., locations of elevator shafts and/or stairwells) may be used to align the exterior contours 120 while identifying the corresponding building 122.

Additionally or alternatively, the model 112 may use additional pages from the blueprint to identify the corresponding building 122. For example, site plans may depict external features around a building (e.g., landscaping, plants, driveways, parking lots, nearby roads, drainage systems, above-ground utility supply lines, below-ground utility supply lines), which may be compared to features within the three-dimensional map 126 to identify a corresponding building 122 with the same or similar external features. For example, in certain implementations, site plans may be used in addition to elevation sheets 116 and/or instead of elevation sheets to identify the corresponding building 122. Site plans may similarly be analyzed to validate a corresponding building 122 identified based on exterior contours and elevation sheets. For example, external features of the corresponding building 122 may be compared to external features within the site plan to ensure that the corresponding building 122 has the same or similar external features. If not, it may be determined that the corresponding building was incorrectly identified and another building may be identified. Where site plans are analyzed, the external features may be identified based on contours determined by machine learning models, similar to the interior contours 118, exterior contours 120, and the elevation contours. Additionally, in such instances, the external features may be added to the dynamic images (e.g., in CAD, GIS, and/or vector formats).

Based on the corresponding building 122, the model 112 may extract a three-dimensional contour 124 of the building 106 from the three-dimensional map 126. For example, the three-dimensional contour 124 may be extracted as the exterior contour of the corresponding building 122 within the three-dimensional map 126. In additional or alternative instances, as explained further below, the three-dimensional contour 124 may include a three-dimensional representation of the exterior contours of the corresponding building 122. Additionally or alternatively, the three-dimensional contour 124 may include coordinates regarding the location of all or part of the building 106. For example, the three-dimensional contour 124 of the building may be stored as a mesh of three-dimensional coordinates that connect to form the three-dimensional contour 124. In such instances, one or more of the three-dimensional coordinates may include geographic location information (e.g., georeferenced latitude and longitude coordinates) that can be used to determine a precise location of the three-dimensional coordinates that form the three-dimensional contour 124. The coordinates may then be used to determine the location of particular features of one or more floors of the building 106. For example, the coordinates may be used to determine further location coordinates for all or part of the interior contours 118, and the exterior contours 120 of the floors of the building 106.

In certain implementations, the exterior contours 120 and the elevation sheets 116 may differ in size or scale from the three-dimensional contour 124 of the corresponding building 122. Accordingly, a size or scale of one or both of the three-dimensional contour 124 and/or the exterior contours 120 and the elevation sheets 116 may need to be adjusted. In such instances, the transformations performed by the model 112 may properly scale the exterior contours 120 and the elevation sheets 116. In additional or alternative implementations, one or more features (e.g., doorways, utility equipment, stairways) of the exterior contours 120 and the elevation sheets 116 may be compared to corresponding features of the three-dimensional contour 124 and/or to expected sizes for the features to determine a difference in size of the features. The exterior contours 120 and the elevation sheets 116 (and/or the three-dimensional contour 124) may be resized based on the difference in size of the features.

The computing device 102 also includes a processor 130 and a memory 132. The processor 130 and the memory 132 may implement one or more aspects of the computing device 102. For example, the memory 132 may store instructions which, when executed by the processor 130, may cause the processor 130 to perform one or more operational features of the computing device 102 (e.g., implement one or more of the models 108, 110, 112). The processor 130 may be implemented as one or more central processing units (CPUs), field programmable gate arrays (FPGAs), and/or graphics processing units (GPUs) configured to execute instructions stored on the memory 132. Additionally, the computing device 102 may be configured to communicate (e.g., to receive the images 104 and/or to transmit one or more of the floor sheets 114, the elevation sheets 116, the interior contours 118, the exterior contours 120, and the three-dimensional contour 124) using a network. For example, the computing device 102 may communicate with the network using one or more wired network interfaces (e.g., Ethernet interfaces) and/or wireless network interfaces (e.g., Wi-Fi, Bluetooth, cellular data interfaces). In certain instances, the network may be implemented as a local network (e.g., a local area network) and/or a global network (e.g., the Internet).

Figure 2:
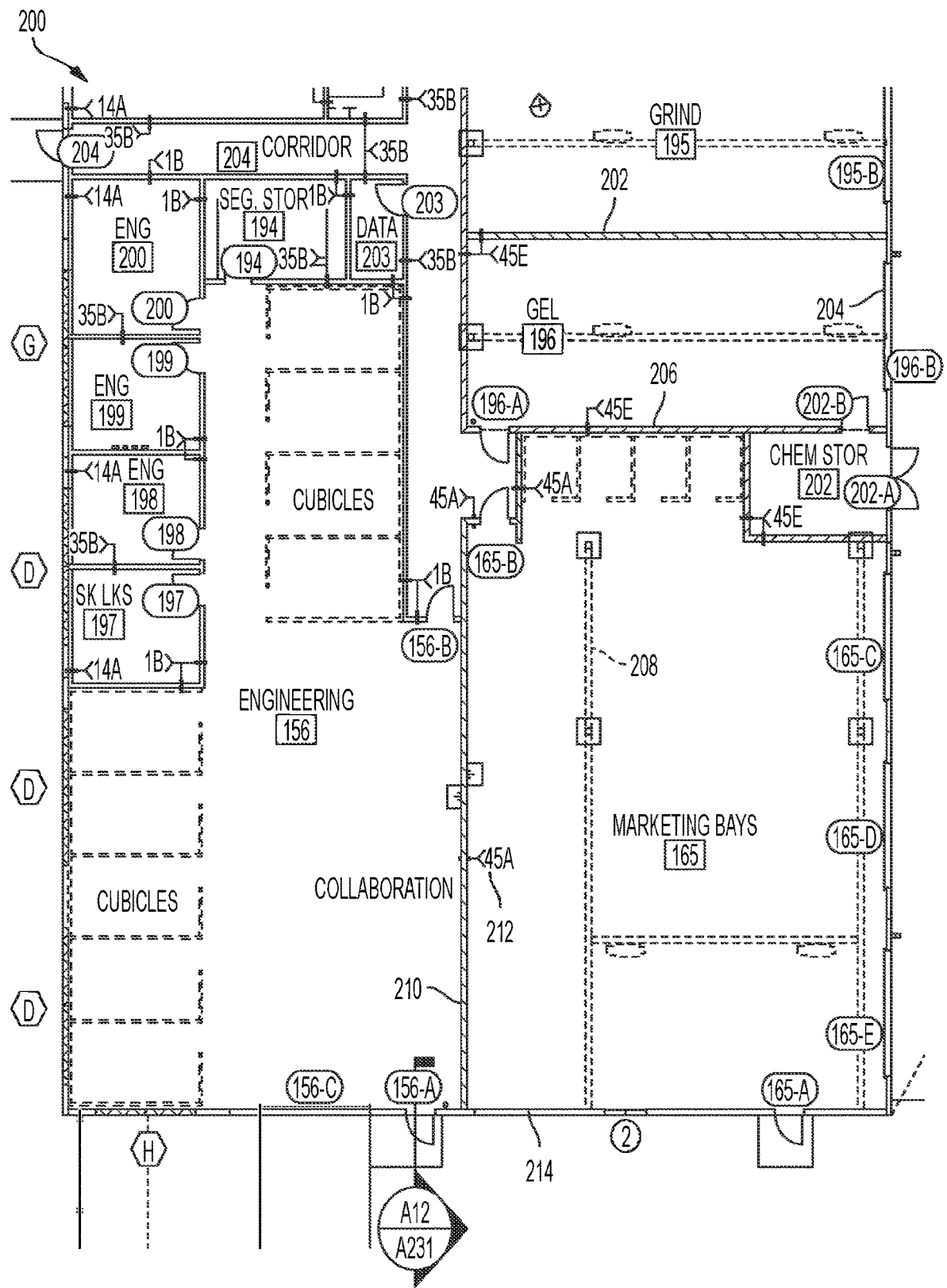
FIG. 2 illustrates a portion of a floor plan from a blueprint according to an exemplary embodiment of the present disclosure.

FIG. 2 illustrates a portion of a floor plan 200 from a blueprint according to an exemplary embodiment of the present disclosure. The floor plan 200 as depicted may be a part of a floor of a building. For example, the floor plan 200 may depict a portion of a floor sheet 114 included within the images 104 received by the computing device 102. The floor plan 200 includes depictions exterior walls 204, 214 and interior walls 202, 206, 210 (only a subset of which are numbered for clarity). The interior walls 202, 206, 210 include two different types of walls: interior partition walls 202, 206 and interior load-bearing walls 210. The floor plan 200 also includes a depiction of a foundation structure 208, along with structural ties 212 connecting other parts of the building (e.g., the interior load-bearing wall 210) to the foundation structure 212. In certain implementations, not all of the depicted features may be necessary to properly determine an interior layout of the building. For example, the foundation structure 208 and the structural ties 212 may not be necessary to accurately determine the interior layout of the floor. Accordingly, the model 110 may be trained to not identify interior contours 118 based on these features of the blueprints. Further, although not depicted here, other sets of blueprints may include depictions of additional systems (e.g., security systems, electrical systems, plumbing systems) within the building, which the model may similarly be trained to disregard when identifying interior contours 118.

Figure 3A:
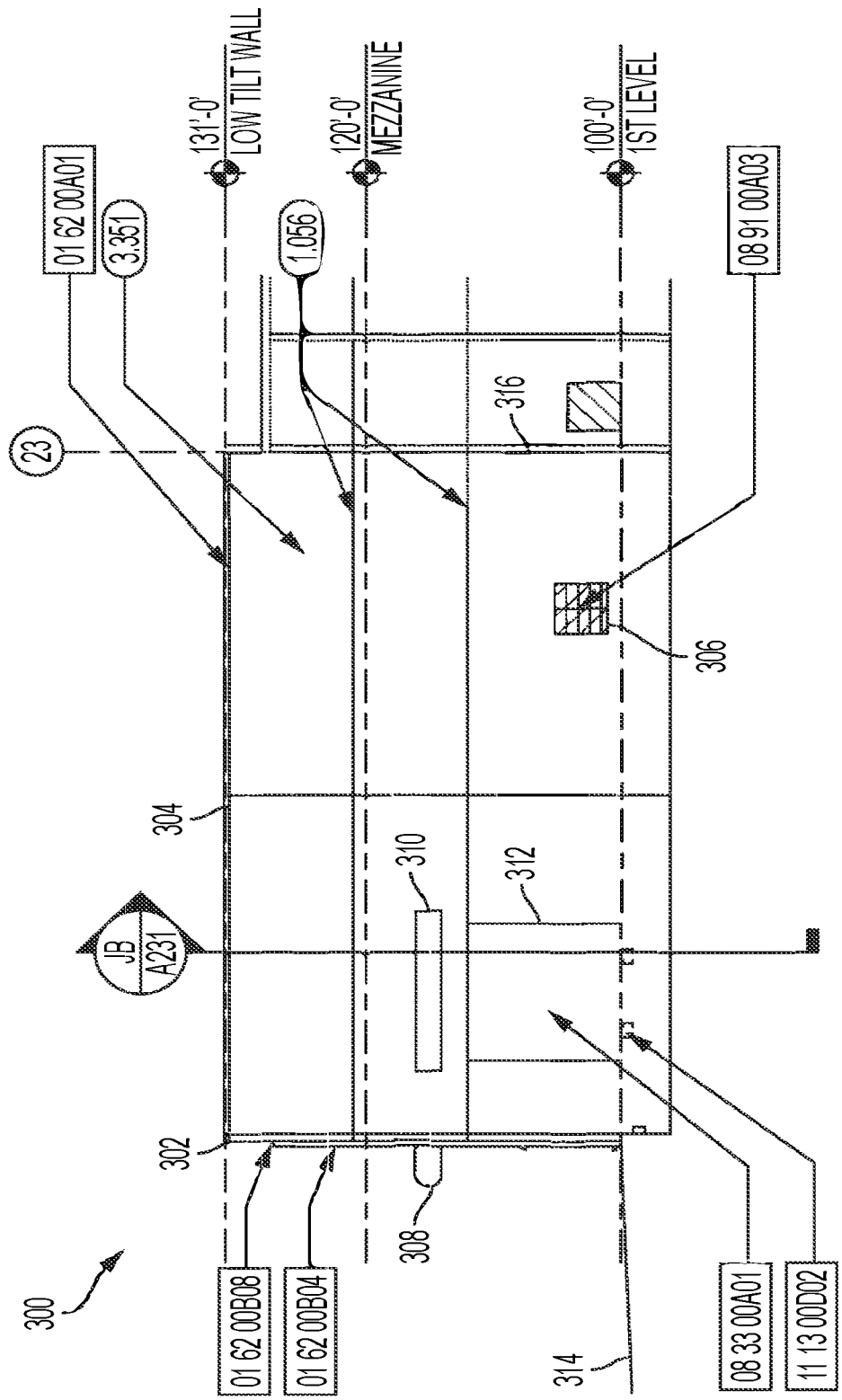
FIGS. 3A-3B illustrate elevation views according to exemplary embodiments of the present disclosure.
Figure 3B:
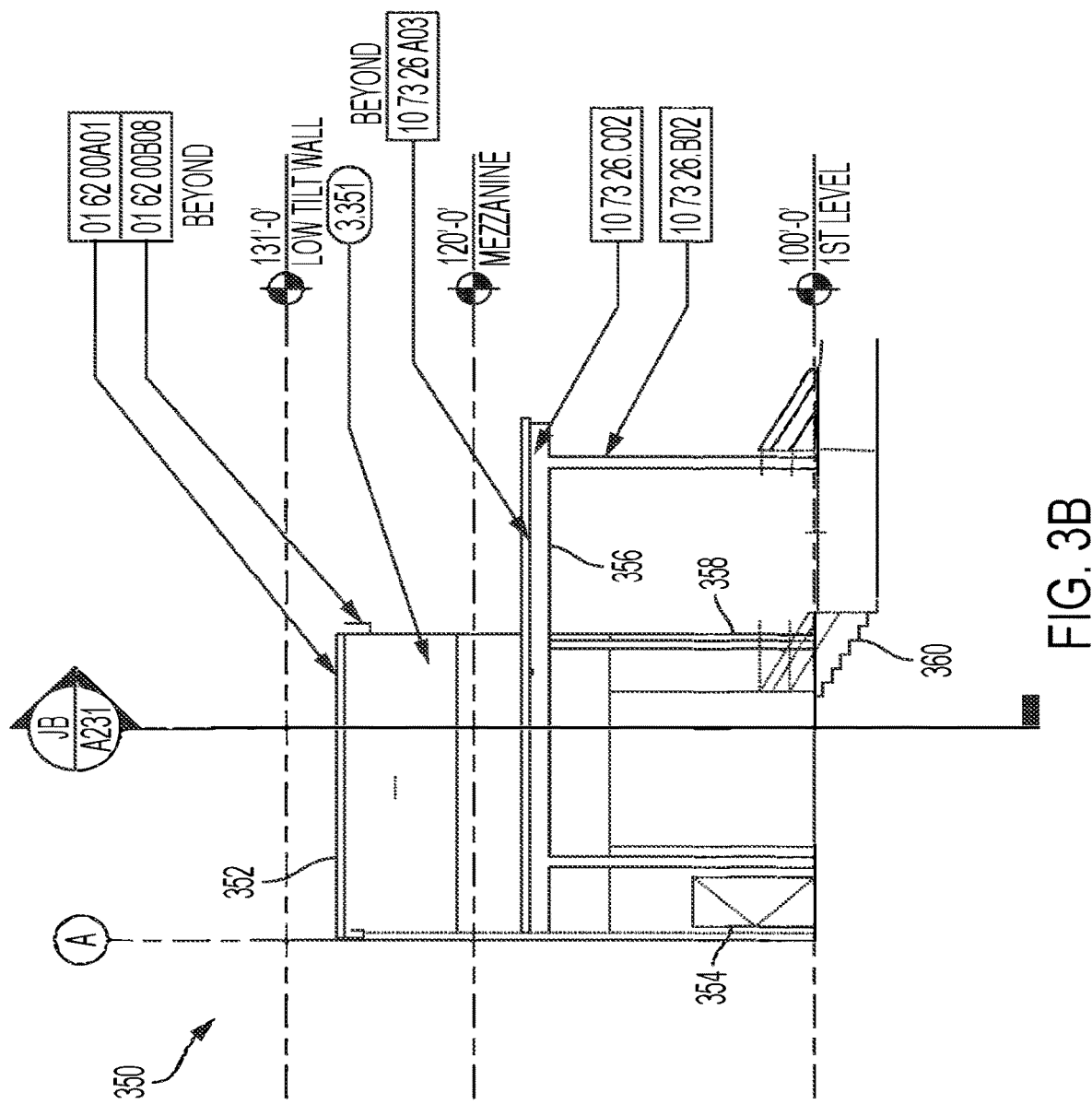

FIGS. 3A-3B illustrate elevation views 300, 350 according to exemplary embodiments of the present disclosure. The elevation views 300, 350 may be a part of an elevation sheet for a building, such as an elevation sheet 116 included within the images 104 received by the computing device 102. The elevation view 300 includes depictions of exterior walls 302, 316 of a building, along with depictions of an exterior window 312. The elevation view 300 also includes depictions of other exterior features, including utility fixtures, such as a grate 306, outcroppings 308, 310, and a ramp 314. The elevation view 350 includes depictions of exterior walls 358, a roof 352, a door 354, and an overhead structure 356. The elevation view 350 includes depictions of an exterior staircase 360.

Figure 4A:
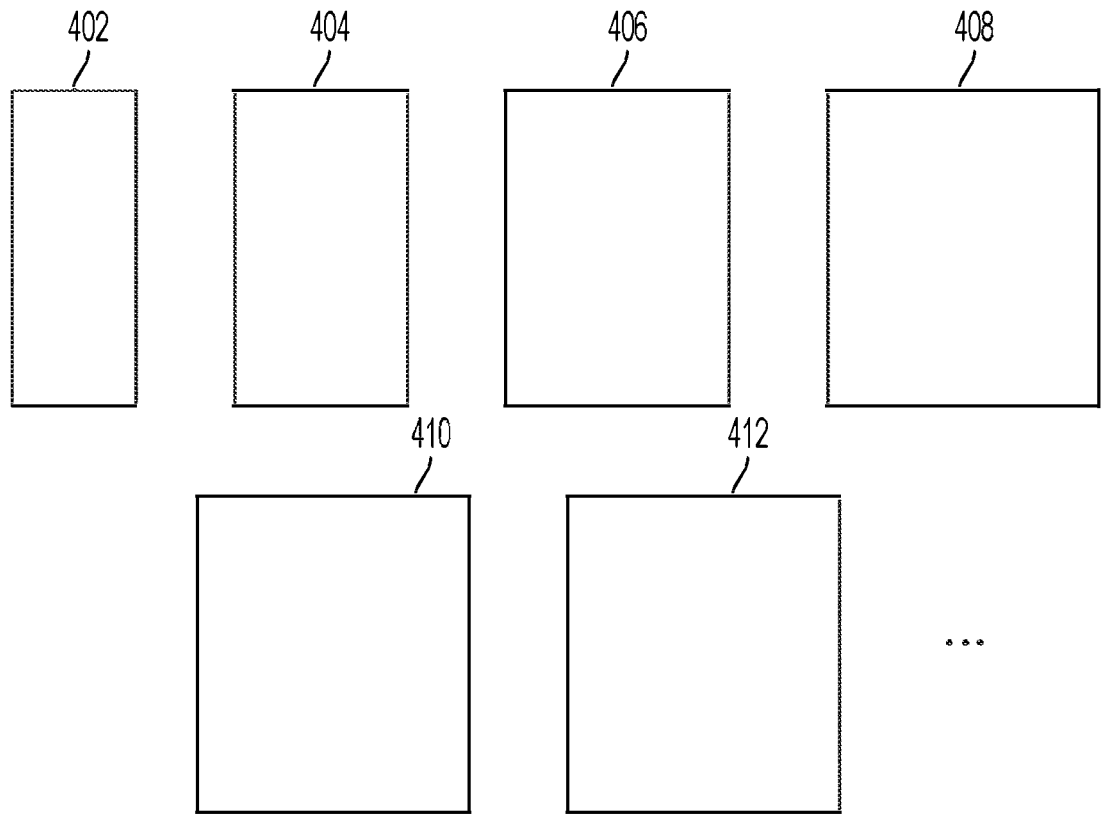
FIG. 4A illustrates exterior contours of the floors of a building according to an exemplary embodiment of the present disclosure.

FIG. 4A illustrates exterior contours 402, 404, 406, 408, 410, 412 of the floors of a building according to an exemplary embodiment of the present disclosure. The exterior contours 402, 404, 406, 408, 410, 412 may be extracted from floor sheets 114, 200 (e.g., by a model 110). For example, the exterior contours 402, 404, 406, 408, 410 may each correspond to a floor of the building and may be extracted from a floor sheet depicting the corresponding floor of the building. In particular, the exterior contour 402 may correspond to a first floor (e.g., lowest floor), the exterior contour 404 may correspond to a second floor above the first floor, the exterior contour 406 may correspond to a third floor above the second floor, the exterior contour 408 may correspond to a fourth floor above the third floor, the exterior contour 410 may correspond to a fifth floor above the fourth floor, the exterior contour 412 may correspond to a sixth floor above the fifth floor. As depicted, as the exterior contours 402, 404, 406, 408, 410, 412 increase in width for higher floors to a maximum width at the fourth floor for the exterior contour 408. The exterior contours 410, 412 are the same width as the exterior contour 408. Additionally, although not depicted, additional exterior contours may be identified (e.g., for higher floors of the building).

It should be understood that the exterior contours 402, 404, 406, 408, 410, 412 may be simplified representations of the contours generated by the model 110 for clarity. For example, the model 110 may, in certain implementations, determine both interior contours and exterior contours based on the blueprints. In such implementations, the interior contours 118 and the exterior contours 120 may be stored together (e.g., as a single collection of contours for each floor of the building). Accordingly, in such implementations, the exterior contours 402, 404, 406, 408, 410, 412 may additionally include interior contours for one or more features within the building.

Figure 4B:
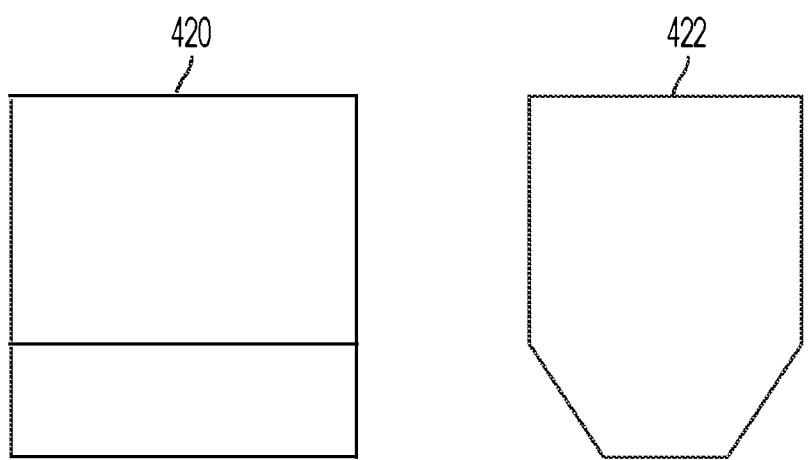
FIG. 4B illustrates elevation contours of a building according to exemplary embodiments of the present disclosure.

FIG. 4B illustrates elevation contours 420, 422 of a building according to exemplary embodiments of the present disclosure. The elevation contours 420, 422 may be a representation of the elevation sheets 116 extracted by the model 108. For example, the elevation contours 420, 422 may represent a simplified version of the elevation sheets 116. In additional or alternative implementations, the elevation contours 420, 422 may represent contours extracted from the elevation sheets. For example, the model 110 and/or a model similar to the model 110 (e.g., a CNN or the like) may be trained to extract contours from elevation sheets 116 and the elevation contours 420, 422 may be received from that model 110. The elevation contour 420 may represent a view from a side of a building, and the elevation contour 422 may represent a view from a front or rear face of the building.

Figure 4C:
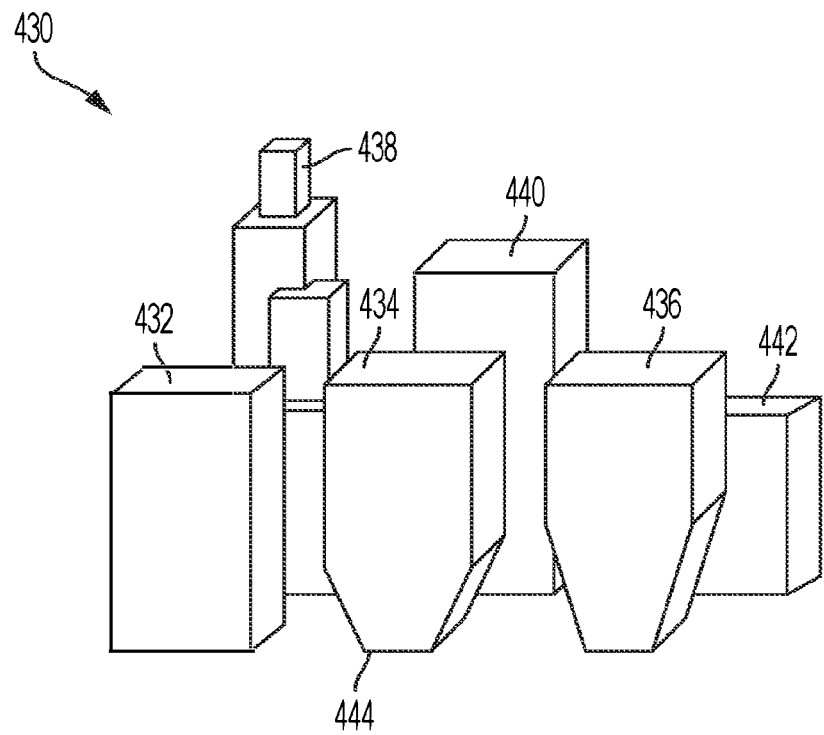
FIG. 4C illustrates a three-dimensional map according to an exemplary embodiment of the present disclosure.

The exterior contours 402, 404, 406, 408, 410, 412 and the elevation contours 420, 422 may be used to identify a corresponding building in a three-dimensional map. For example, the model 112 may use the exterior contours 402, 404, 406, 408, 410, 412 and the elevation contours 420, 422 to identify the corresponding building 122. As a specific example, FIG. 4C illustrates a three-dimensional map 430 according to an exemplary embodiment of the present disclosure. The three-dimensional map 430 may be an exemplary implementation of the three-dimensional map 126. The three-dimensional map includes three-dimensional representations of buildings 432, 434, 436, 438, 440, 442. In particular, the three-dimensional map 430 may include three-dimensional representations of an area surrounding a building (e.g., an area located near an address of a building for which images 104 of blueprints are received). For example, in addition to three-dimensional representations of the buildings 432, 434, 436, 438, 440, 442, the three-dimensional map 430 may include three-dimensional representations of other aspects of the area (e.g., roadways, sidewalks, parks, and/or other features). It should be understood that the size of the three-dimensional map 430 may be smaller than is typically used in practice. For example, three-dimensional maps analyzed by the model 112 may typically encompass a larger area than that depicted in the three-dimensional map 430 (e.g., one or more city blocks containing more building than those depicted in the three-dimensional map 430).

Several of the buildings 432, 434, 436, 438, 440, 442 have similar shapes. For example, the buildings 432, 440, 442 are rectangular, but have different heights. In certain areas (e.g., urban environments), many buildings may be located near one another with similar exterior shapes. For example, the buildings 434, 436 both have tapered bottoms, with the tapered bottom of the building 436 starting higher than the building 434. In such instances, it may be necessary to use small differences in exterior shape (e.g., as indicated by the floor sheets 114 and/or elevation sheets 116) and the corresponding exterior contours 402, 404, 406, 408, 410, 412 and elevation contours 420, 422 to distinguish between buildings located near one another. It should be understood that the difference in shapes for the buildings 432, 434, 436, 438, 440, 442 map 430 may be exaggerated for clarity of discussion. In particular, in certain instances multiple adjacent buildings may have the same or very similar exteriors and the model 112 may compare certain portions of the exteriors of the building to identify the correct corresponding building 122. For example, a row of eight building may have nearly identical exterior contours and the model 112 may compare the location of certain types of features (e.g., utility fixtures such as air conditioners and water line hookups) to determine the correct corresponding building 122 that has the features in the same location as extracted from the exterior contours 120 and the elevation sheets 116. Additionally or alternatively, site plans may be used to distinguish between buildings with similar exterior contours, using techniques discussed above.

Figure 4D:
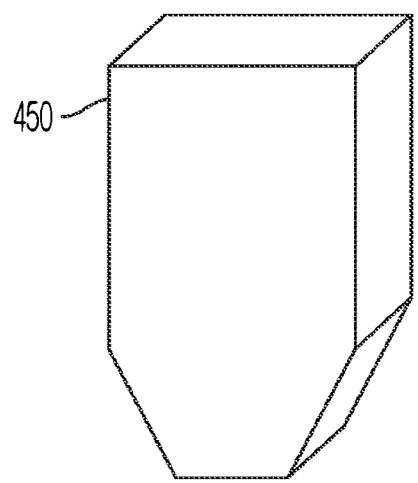
FIG. 4D illustrates a three-dimensional contour of the exterior of a building according to an exemplary embodiment of the present disclosure.

As a specific example, the building 436 starts tapering higher than the tapering indicated in the exterior contours 402, 404, 406, 408, 410, 412 and elevation contours 420, 422. Accordingly, when selecting between the similarly-shaped buildings 434, 436, the building 434 may be identified as the corresponding building 122 by the model 112. After identifying the building 434 as the corresponding building 122, the model 112 and/or the computing device 102 may extract a three-dimensional contour 124 of the building 434. For example, FIG. 4D illustrates a three-dimensional contour 450 of the exterior of the building 434 according to an exemplary embodiment of the present disclosure. The three-dimensional contour 450 may be used to provide a representation of the exterior of the building 434. For example, the three-dimensional contour 450 may be presented to first responders arriving at the building prior to viewing additional layout information regarding the building 434. Additionally or alternatively, the model 112 and/or the computing device 102 may extract one or more coordinates based on the identified corresponding building 122. For example, the three-dimensional map 430 includes a coordinate 444 for at least one corner of the building 434. The coordinate 444 may indicate a precise location of the corresponding portion (e.g., the corner) of the building 434. The coordinate 444 may be used to determine location coordinates for other parts of the building 434. For example, locations of the exterior contours 402, 404, 406, 408, 410, 412 and/or interior contours of the building 434 may be determined relative to the coordinate 444. For example, the computing device 102 and/or the model 112 may determine a location of the exterior contours 402, 404, 406, 408, 410, 412 and/or interior contours relative to the three-dimensional contour 450. The locations relative to the three-dimensional contour 450 may be used to determine location coordinates for all or part of the exterior contours 402, 404, 406, 408, 410, 412 based on the coordinate 444. In certain implementations, the three-dimensional contour 350 may include multiple coordinates 444 (e.g., a mesh of georeferenced coordinates), as discussed above. Additionally, the locations for the exterior contours 402, 404, 406, 408, 410, 412 may be converted to a particular coordinate system. For example, where the system is used by first responders, location sensors associated with the first responders may be in a global and/or local coordinate system (e.g., GPS coordinates, coordinate systems determined by a personnel tracking system such as a Blue Force 6 system). In certain instances, the locations of the exterior contours may be determined relative to a fixed location at or near the building (e.g., relative to a local frame of reference near or within the building). For example, the locations may all be determined relative to a point or location within the building (e.g., a corner of the building, an entrance to the building) or to a nearby piece of equipment (e.g., equipment configured to receive location signals from location sensors worn by the first responders). Such local coordinate systems may be used when GPS signals are not available (e.g., because signals are blocked within the building) so that other types of location measurements (e.g., magnetic signal measurements, ultrasonic distance measurements, radio frequency signal measurements) may be utilized that are better able to be transmitted and received within the building.

In this way, interior contours and exterior contours can be extracted from images of blueprints while also ensuring accurate location data within the interior contours and the exterior contours. For example, the location data of the interior contours and the exterior contours may be georeference data, such as GPS coordinates. Such location data may be used to monitor the location of one or more individuals within the building. For example, first responders may combine the location data determined in this manner with location measurements for themselves or others to monitor their own location and/or locations of other individuals (e.g., other first responders) within the building.

Figure 5:
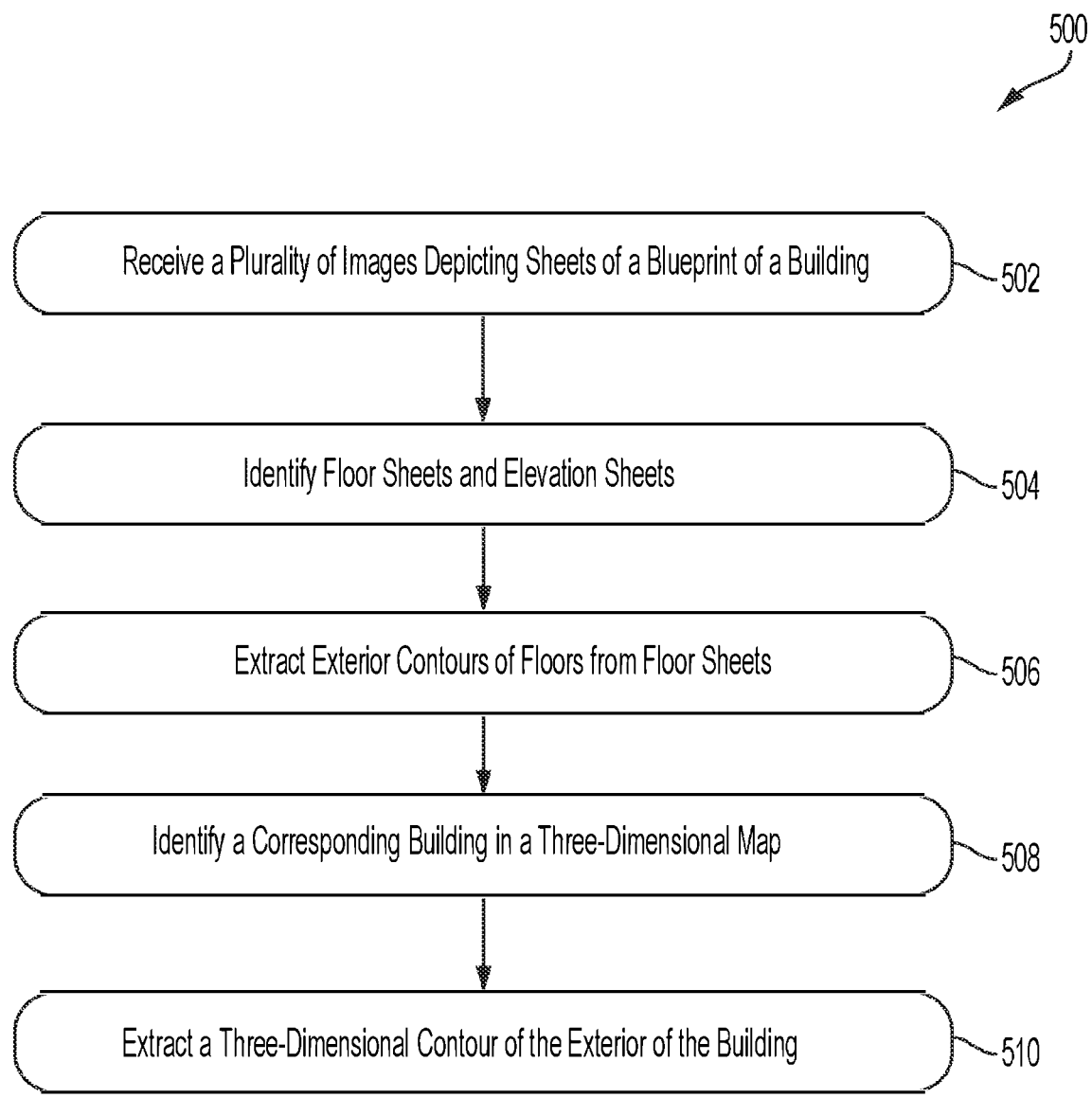
FIG. 5 illustrates a method according to an exemplary embodiment of the present disclosure.

FIG. 5 illustrates a method 500 according to an exemplary embodiment of the present disclosure. The method 500 may be performed to receive and process images depicting sheets of a blueprint of a building. In particular, the method 500 may be performed to extract one or more contours from the blueprint and to extract a three-dimensional contour of a corresponding building in a three-dimensional map. The method 500 may be implemented on a computer system, such as the system 100. For example, the method 500 may be implemented by the computing device 102. The method 500 may also be implemented by a set of instructions stored on a computer readable medium that, when executed by a processor, cause the computer system to perform the method 500. For example, all or part of the method 500 may be implemented by the processor 130 in the memory 132. Although the examples below are described with reference to the flowchart illustrated in FIG. 5, many other methods of performing the acts associated with FIG. 5 may be used. For example, the order of some of the blocks may be changed, certain blocks may be combined with other blocks, one or more of the blocks may be repeated, and some of the blocks described may be optional.

The method 500 begins with receiving a plurality of images depicting sheets of a blueprint of a building (block 502). For example, the computing device 102 may receive images 104 of a blueprint of a building 106. As described above, the images 104 may be received from a database of blueprint images and/or may be received from a scanner that scanned a copy of the blueprint of the building 106. In an example, the images 104 may be received as two-dimensional raster images of the blueprints.

Floor sheets and elevation sheets may be identified (block 504). For example, the images 104 may be provided to a model 108, which may be trained to identify floor sheets 114, and elevation sheets 116 depicted within the images 104. As explained further above, the floor sheets 114 may depict details regarding the locations of interior walls, exterior walls, fixtures, plumbing systems, and/or other systems for the floors of the building 106 and the elevation sheets 116 may depict side views of the exterior of the building 106. In certain implementations, site plans may also be extracted (e.g., in addition to or alternative to elevation sheets).

Exterior contours of floors may be extracted from the floor sheets (block 506). For example, a model 110 may extract exterior contours 120 from the floor sheets 114. For example, the model 110 may receive multiple floor sheets 114 and may generate exterior contours 120 for each of the floor sheets 114. Further, each floor sheet 114 may correspond to all or part of a floor of the building 106, and the exterior contours 120 extracted from the floor sheets 114 may similarly correspond to the same floor or portion thereof. In certain implementations, the model 110 or a similarly-configured model may be additionally configured to extract contours from the elevation sheets 116. In certain implementations, in addition to extracting exterior contours 120, the model 110 may be configured to extract interior contours 118 of the floor sheets 114. For example, the interior contours 118 may be extracted to include outlines around the locations of one or more desired features of the floors.

A corresponding building may be identified in a three-dimensional map (block 508). For example, a model 112 may identify a corresponding building 122 within a three-dimensional map 126 of an area 128 surrounding the building 106. As explained further above, the corresponding building 122 may be identified by the model 112 based on the elevation sheets, site plans, and/or exterior contours 120. In certain implementations, the model 112 may identify the corresponding building 122 directly from the elevation sheets 116 and/or exterior contours 120. In additional or alternative implementations, the model 112 may identify the corresponding building by extruding the exterior contours 120 and/or the elevation sheets 116 to generate a three-dimensional model of the building 106 (e.g., may generate a "virtual building plan" of the building 106). In certain instances, the model 112 may identify the corresponding building 122 based on the three-dimensional model of the building 106. In further instances, a building 106 may be identified based on one or more separate, external features that are not part of the building 106. For example, one or more of the sheets of a blueprint may indicate that there is a transformer 50 feet from the building, or that the building includes a surrounding parking lot or driveway. In such instances, the model 112 may identify the corresponding building 122 based on a model of the building 106 and at least one model of the separate features (e.g., a model of the transformer, a model of the driveway/parking lot). Furthermore, it should be understood that any combination of exterior contours, elevation contours, and/or separate, external features may be used to identify the corresponding building 122 in various embodiments.

A three-dimensional contour of the exterior of the building may be extracted (block 510). For example, the model 112 and/or the computing device 102 may extract a three-dimensional contour 124 of the corresponding building 122 within the three-dimensional map 126. The three-dimensional contour 124 may represent a three-dimensional model of the exterior of the building 106. In addition to the three-dimensional contour 124, the computing device 102 and/or the model 112 may extract one or more location coordinates of the corresponding building 122 from the three-dimensional map 126. As explained above, the location coordinates may be used to determine locations for all or part of the exterior contours 120, interior contours 118, and/or other features of the building 106.

By performing the method 500, the computing device 102 may be enabled to quickly determine an accurate three-dimensional contour 124 for building 106. Additionally, when interior contours 118 are extracted by the model 110, the computing device 102 may be enabled to determine accurate interior layout of the building 106 based on the images 104 of the blueprints. Further, the interior contours 118 and exterior contours 120 may, in certain instances, be stored as dynamic images (e.g., vector or other non-raster images). The dynamic images may enable greater zoom levels without comprising the clarity and/or details of the building. In combination with location information, such dynamic images may enable users located within a building to view, in greater detail, the layout of the building immediately surrounding the users' current locations. Additionally, the location information may be used to monitor locations of multiple users within the building.

Furthermore, by aligning the frames of reference for the interior contours, the exterior contours, and elevation contours of the building, precise location coordinates can be extracted from the three-dimensional map 126, enabling the above benefits. In particular, interior contours may be used to align the exterior contours and the elevation contours. Such techniques may enable substantially improved comparisons of the exterior contours and elevation contours to the three-dimensional map 126, enabling accurate identification of the corresponding building 122. Accordingly, the method 500 improves the accuracy and speed with which locations of features within the building may be determined while also improving the quality and clarity of a virtual building plan. Accurate and seamless identification of virtual building plans may be essential for use in first responder scenarios so that the first responders can be assured of their locations within the building. For example, first responders may need to accurately determine which room on a particular floor they need to enter and precise location information may be necessary to help the first responders discern the correct room (e.g., when entrances to many nearby rooms look the same or similar). Improved accuracy of the virtual building plans ensures that the first responders are better able to identify the particular room to enter based on location information associated with the first responders, enabling better-informed and more deliberate actions by the first responders.

In still further implementations, methods similar to the method 500 may be used to extract features from documents other than blueprints. For example, similar techniques may be performed to extract features (e.g., contours of features) from images of documents such as wiring diagrams, CAD drawings, product drawings, design documents, product documentation, circuit diagrams, electrical schematics, maintenance diagrams, power system diagrams, and the like. In such implementations, dynamic images may be generated based on the extracted contours. In particular, techniques similar to those of blocks 502-506 may be performed to extract features from other types of documents (e.g., using machine learning models trained for the other types of documents).

Additionally, certain implementations of methods similar to the method 500 may omit one or more steps. For example, a model may be trained to identify corresponding buildings within maps that are not three-dimensional (e.g., that include two-dimensional, overhead views or contours of buildings and other structures). In such instances, only floor sheets may be identified at block 504. Furthermore, at block 508, the model may not rely on elevation contours and may instead locate the building based on exterior contours from the floor sheets.

Figure 6:
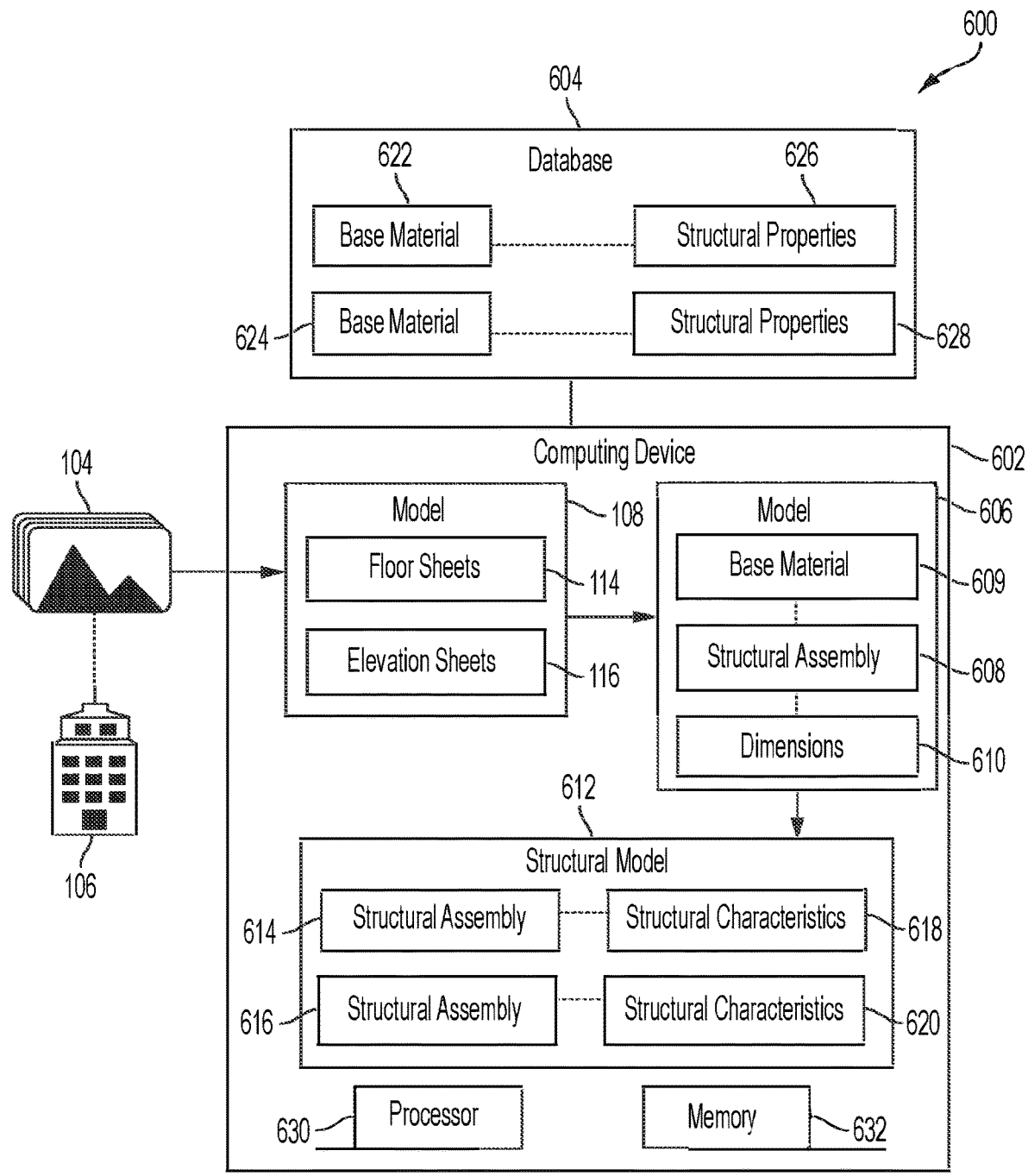
FIG. 6 depicts a system according to an exemplary embodiment of the present disclosure.

FIG. 6 depicts a system 600 according to an exemplary embodiment of the present disclosure. The system 600 may be configured to generate structural models 612 (e.g., three-dimensional structural models, two-dimensional structural models) based on information extracted from received blueprints within the images 104. For example, the structural model 612 may represent working geometric models of a structure 106 depicted in a set of blueprints, such as a "digital twin" of the structure 106. The structural model 612 may be a digital representation of the structural characteristics of the structure 106, such as the strength (e.g., in tension, in compression), rigidity, and/or flexibility of various structural elements with the structure 106. In such instances, the structural model 612 may be used to model physical destruction or damage to the structure 106, such as during a natural disaster (e.g., flood, earthquake), during a military strike, during a fire, and the like. Additionally or alternatively, the structural model 612 may be used to model physical interactions within the structure 106, such as during building inspections, testing, and maintenance; building systems inspections, testing, and maintenance; performance contracting (e.g., for HVAC systems); architectural engineering and design; school safety; police interventions, and the like.

The system 600 includes a computing device 602 and a database 604. The computing device 602 receives the images 104 of the structure 106, similar to the computing device 102. In certain implementations, the computing device 602 may be implemented by the computing device 102. For example, the computing devices 102, 602 may be implemented by a single computing device configured to generate contours 118, 120, 124 of the structure 106, georeference the contours 118, 120, 124, and create a structural model 612 of the structure 106. The computing device 108 includes the model 108, which may be configured to identify floor sheets 114 and elevation sheets 116 from within the images 104, as discussed above.

The computing device 602 also includes a model 606, which may be configured to identify structural assemblies 608 within the floor sheets 114 and elevation sheets 116. For example, the structural assemblies 608 may correspond to sections of walls and/or floors within the structure 106. In particular, the model 606 may be configured to identify load-bearing wall sections and/or floor sections within the floor sheets 114 and elevation sheets 116 as structural assemblies 608. In additional or alternative implementations, the structural assemblies may include internal components within the walls or floors, such as electrical equipment and/or ductwork to allow the structural model 612 to be used for building inspections, building system inspections, performance contracting, and the like. To identify the structural assemblies 608, the model 606 may be configured to identify particular keywords within the floor sheets 114 and elevation sheets 116, such as "load-bearing wall," "beam," "duct," "electrical," and the like.

Once a particular structural assembly 608 is identified, the model 606 may identify a base material 609 and dimensions 610 for the structural assembly 608. The base material 609 may include information on the structural materials used to form the structural assembly 608. For example, where the structural assembly 608 is a wall assembly for a load-bearing wall, the base material 609 may include the components used to form the wall assembly, such as a type of external cladding (e.g., for an exterior wall), stud size, stud spacing, or other material used to assemble the wall (e.g., brick type, brick size). As another example, where the structural assembly 608 is a floor assembly used to form a floor, the base material 609 may include the components used to form the floor assembly, such as the type and spacing of floor joists, a type of flooring used. In such instances, the floor assembly may also be a beam used to provide rigidity to the floor, the base material 609 may include information on the size (e.g., thickness) of the beam, and the type of material used to form the beam. The base material 609 may be identified based on information within the images 604. For example, blueprints typically include a table of materials that identifies corresponding materials used to form various portions of a depicted structure. In such instances, the model 606 may be configured to identify a reference number or other identifier of the structural assembly 608 and then identify the corresponding reference number within the table of materials. A corresponding material (e.g., assembly type, beam type, etc.) may be identified as the base material 609. For example, the corresponding material may include the size or type of beam (e.g., wooden beam, metal beam), the size or type of drywall or other material used to form the surface of a given wall assembly or floor assembly. As another example, the corresponding material may include multiple materials used in a given assembly, such as the type of studs, drywall, insulation, and lateral support members used in the assembly.

The dimensions 610 may represent physical dimensions of the structural assembly 608 within the structure 106. For example, the dimensions 610 may represent the physical dimensions of the entire structural assembly (e.g., thickness, width, and depth of a wall assembly or floor assembly) and/or may represent the physical dimensions of a portion of the structural assembly 608 (e.g., a load-bearing beam within a floor assembly). The dimensions 610 may be determined by finding a bounding box around the desired structural assembly 608 or portion thereof within the floor sheets 114 and/or elevation sheets 116. The dimensions 610 may then be determined based on the size of the bounding box within the floor sheets 114 and the elevation sheets 116 (e.g., according to scale(s) within the floor sheets 114 and elevation sheets 116). For example, the height and width of a wall assembly may be determined based on the size of a bounding box around the wall assembly within a corresponding elevation sheet 116 and the thickness of a wall assembly may be determined based on the size of a bounding box around the wall assembly within a corresponding floor sheet 114.

In certain implementations, the model 606 may be a software service configured to perform one or more of the above operations. In additional or alternative implementations, the model 608 may be a machine-learning model trained to identify one or more of the structural assembly 608, the dimensions 610, and/or the base material 609.

The computing device 602 and/or the model 606 may use the base material 609 and the dimensions 610 to determine structural characteristics for the structural assembly 608. The structural characteristics may include structural engineering data, construction data, building materials, systems, and utility information, or any other aspects of structural assemblies 608 that can be assigned to the geometry of a structure 106 to approximate the functioning of the structure 106. For example, the structural characteristics may include one or more of a strength of the structural assembly 608 (e.g., in tension, in compression), a rigidity of the structural assembly 608, a flexibility of the structural assembly 608, an impact resistance of the structural assembly 608, a flammability of the structural assembly 608, an airflow through the structural assembly 608 (e.g., for an HVAC duct system), an electrical rating for the structural assembly 608 (e.g., for an electrical system), a thermal insulation rating of the structural assembly 608, and the like. To determine the structural characteristics, the computing device 602 may identify structural properties for the base material 609 used to form the structural assembly 608. In particular, the database 604 may store information regarding various types of base materials 622, 624. For instance, as depicted, the database 604 may store indicators of base materials 622, 624 and corresponding structural properties 626, 628. The structural properties 626, 628 may represent elementary forms of the structural characteristics of interest for the structural assembly 608. In particular, the structural properties 626, 628 may represent the physical aspects of the materials used to form a structural assembly, while the structural characteristics may represent the physical aspects of the structural assembly itself. For example, the structural properties 626, 628 may represent dimensionless measures of the strength, rigidity, flexibility, impact resistance, flammability, airflow, and/or electrical rating for different types of floor assemblies, wall assemblies, HVAC ducts, and electrical systems. To determine the structural characteristics for the structural assembly 608, the computing device 602 may identify structural properties 626, 628 corresponding to the base material 608 and may derive the structural characteristics from the structural properties 626, 628. For example, the structural properties 626, 628 may be multiplied or divided by various dimensions to determine the structural characteristics. As one specific example, the impact resistance for a wall assembly may decrease as the height and/or width of the wall increases, but may increase as the thickness increases. Therefore, to determine an impact resistance characteristic for a wall assembly, the computing device 602 may multiply by the impact resistance structural property by the thickness dimension and divide it by the height and width dimensions. The computing device 602 and/or the database 604 may store instructions for converting between structural properties and structural characteristics for different types of assemblies.

The structural model 612 may then be updated to include the structural assembly 608. For example, the computing device 602 may add the structural assembly 608 to the structural model 612. The structural model 612 includes multiple structural assemblies 614, 616 with corresponding structural characteristics 618, 620. The structural characteristics 618, 620 may be used to enable physical simulation of the structure 106 based on the structural model 612. For example, the structural characteristics 618, 620 may be used to simulate impact, explosions, flooding, earthquakes, fires, or other physical damage to the structure 106 to predict the effects of such damage on the structure 106. Structural assemblies 614, 618 may be linked to one another according to physical layout of the structure 106. For example, the structural assemblies 614, 618 may be adjacent wall assemblies that meet at a corner, and the structural model 612 may store a structural link between the two structural assemblies 614, 618 to indicate that they are physically linked. Such links may be used in simulations of the building. To add the structural assembly 608 to the model 606, the computing device 602 may add an indicator of the structural assembly 608, the dimensions 610, and the structural characteristics calculated for the structural assembly. The computing device 602 may also link the structural assembly 608 to adjacent structural elements. For example, the structural assembly 608 may be a floor beneath the wall assemblies 614, 616 and the computing device 602 may store a structural link between the structural assembly 608 and the adjacent structural assemblies 614, 616. In certain implementations, the structural model 612 may be generated based on a three-dimensional contour of the structure, such as the three-dimensional contour 124. For example, structural characteristics 618, 620 may be assigned to corresponding portions of the three-dimensional contour 124, which may be identified based on corresponding portions of the floor sheets 114 and/or elevation sheets.

In practice, the floor sheets 114 and elevation sheets 116 may contain multiple structural assemblies. To generate the structural model 612, the computing device 602 may repeat the above-described operations for each structural assembly identified within the floor sheets 114, 116. However, it may not always be necessary to incorporate every structural assembly into a structural model 612 to accurately simulate the structure 106. As a first example, the physical integrity of a structure may be primarily determined by load bearing walls, primary floor beams, and external cladding for the structure. In such instances, the computing device 602 may limit the above analysis to only include such structural assemblies. For example, the keywords used to identify structural assemblies may be limited to only incorporate load bearing walls, floor beams, and external cladding (e.g., external wall assemblies). As a second example, a structural model 612 may be generated for use in modeling climate control performance in a building. In such instances, the computing device 602 may limit the analysis to only include structural assemblies that focus on HVAC systems and associated climate control components (e.g., air conditioners, air handlers, outside compressors, ducts, required electrical connections) and associated dimensions for rooms that are being climate controlled. As a third example, the structural model 612 may be generated for use in modeling wireless network performance (e.g., Wi-Fi performance) within a structure (or a portion of the structure). In such instances, the computing device 602 may limit the analysis to include Wi-Fi router locations, cable routing locations, and wall assembly information. In still further examples, a multi-purpose structural model 612 may be created (e.g., to perform the functions of the first, second, and third examples above), and the computing device 602 may analyze multiple types of components.

As depicted, the database 604 may be executed by a separate computing device from the computing device 602. In such instances, the computing device 602 may communicate with the database 604 via a network interface (e.g., a wired or wireless network interface) or a network (e.g., a local network, a global network). Additionally or alternatively, the database 604 may be implemented by (e.g., stored within) the computing device 602.

The computing device 602 also includes a processor 630 and a memory 632, which may implement one or more operational aspects of the computing device 602. For example, the memory 632 may store instructions which, when executed by the processor 630, cause the processor 630 to implement one or more operational features of the computing device 602. Although not depicted, the database 604 may similarly include a processor and/or a memory configured to implement one or more operational features of the database 604.

Figure 7:
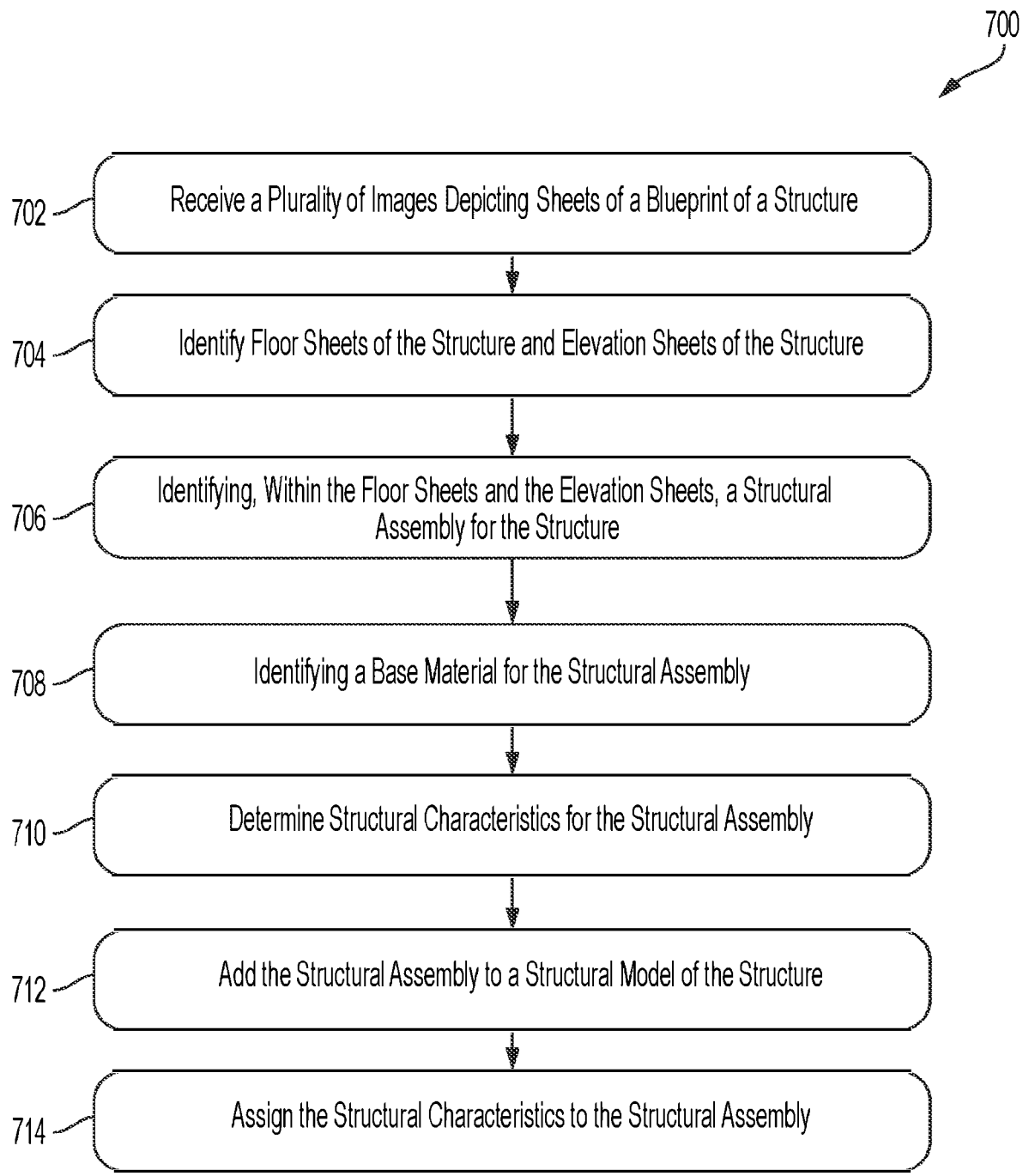
FIG. 7 depicts a method according to an exemplary embodiment of the present disclosure.

FIG. 7 depicts a method 700 according to an exemplary embodiment of the present disclosure. The method 700 may be performed to generate a structural model of a structure based on images of building plans or blueprints for the structure. The method 700 may be implemented on a computer system, such as the systems 100, 600. For example, the method 700 may be implemented by the computing devices 102, 602. The method 700 may also be implemented by a set of instructions stored on a computer readable medium that, when executed by a processor, cause the computer system to perform the method 700. For example, all or part of the method 700 may be implemented by the processors 630 in the memory 632. Although the examples below are described with reference to the flowchart illustrated in FIG. 7, many other methods of performing the acts associated with FIG. 7 may be used. For example, the order of some of the blocks may be changed, certain blocks may be combined with other blocks, one or more of the blocks may be repeated, and some of the blocks described may be optional.

The method 700 may begin with receiving a plurality of images depicting sheets of a blueprint of a structure (block 702). For example, the computing device 102, 602 may receive image 104 depicting sheets of a blueprint of a structure 106, as discussed above (e.g., in connection with block 502 of the method 500). Floor sheets and elevation sheets of the structure may be identified (block 704). For example, the model 108 may identify floor sheets 114 and elevation sheets 116 from among the images 104, as discussed above (e.g., in connection with block 504 of the method 500).

A structural assembly for the structure may be identified within the floor sheets and/or elevation sheets (block 706).

For example, the computing device 602 may identify a structural assembly 608 within the floor sheets 114 and/or elevation sheets 116. As explained above, the structural assembly 608 based on keywords and/or the machine learning model. In certain implementations, the structural assembly 608 may be identified as a primary structural element of the structure 106, such as a load bearing wall, a floor assembly beam, and/or an exterior wall.

A base material may be identified for the structural assembly (block 708). For example, the computing device 602 may identify a base material 609 for the structural assembly 608. The base material 609 may be identified within the image 104 (e.g., within a table of materials) of the blueprint. For example, a reference numeral for the structural assembly 608 may be identified within the floor sheets 114 and elevation sheets 116 and a corresponding base material 609 may be identified within the table of materials. The base material 609 may identify the material or dimensions used to make an assembly and may additionally or alternatively include information on the components or type of assembly.

Structural characteristics may be determined for the structural assembly (block 710). For example, the computing device 602 may determine structural characteristics for the structural assembly 608. The structural characteristics may be determined based on the base material 609. For example, the computing device 602 may retrieve structural properties from the database 604 based on the base material 609. The computing device 602 may then compute structural characteristics for the structural assembly based on the structural properties. In particular, the model 606 may determine dimensions 610 for the structural assembly 608 and may determine the structural characteristics based on the dimensions 610 and the structural properties.

The structural assembly may be added to a structural model of the structure (block 712). The structural characteristics may be added to the structural assembly within the structural model (block 714). For example, computing device 602 may add the structural assembly 608 to structural model 612 of the structure 106. Adding the structural assembly 608 may include adding dimensions for the structural assembly 608 to a corresponding portion of the structural model 612, along with the structural characteristics. In such instance, the structural assembly 608 may also be structurally linked to adjacent structures. In additional or alternative implementations, adding the structural assembly 608 may include adding structural characteristics to a corresponding portion of a three-dimensional contour of the 124 of the structure 106.

In this manner, the computing device 602 may generate a structural model for a structure based on images of blueprints of the structure. In particular, rather than requiring additional three-dimensional or two-dimensional representations of the structure, the computing device is able to extract features from the blueprints. Such models may then be used to predict how a building may be damaged. For example, such models can have use in disaster planning situations such as natural disasters. As another example, such models maybe used to plan military strikes or to predict the effects of such attacks on a building. In another example, the structural assembly may be ductwork and/or electrical equipment, and the building model can be used for building or building system inspections (e.g., by seeing wiring and/or ductwork behind walls or in ceilings/floors.

All of the disclosed methods and procedures described in this disclosure can be implemented using one or more computer programs or components. These components may be provided as a series of computer instructions on any conventional computer readable medium or machine readable medium, including volatile and non-volatile memory, such as RAM, ROM, flash memory, magnetic or optical disks, optical memory, or other storage media. The instructions may be provided as software or firmware, and may be implemented in whole or in part in hardware components such as ASICs, FPGAs, DSPs, or any other similar devices. The instructions may be configured to be executed by one or more processors, which when executing the series of computer instructions, performs or facilitates the performance of all or part of the disclosed methods and procedures.

It should be understood that various changes and modifications to the examples described here will be apparent to those skilled in the art. Such changes and modifications can be made without departing from the spirit and scope of the present subject matter and without diminishing its intended advantages. It is therefore intended that such changes and modifications be covered by the appended claims.

The invention claimed is:

1. A method comprising:
receiving a plurality of images depicting sheets of a blueprint of a structure;
identifying, based on the plurality of images, exterior contours of floors of the structure and elevation contours of the structure;
identifying, based on the exterior contours and the elevation contours, a three-dimensional contour corresponding to the structure in a three-dimensional map of an area surrounding the structure; and
extracting, from the three-dimensional map, the three-dimensional contour of an exterior of the structure.

2. The method of claim 1, wherein identifying the exterior contours of the floors of the structure further comprises:
identifying, for each of at least a first plurality of images, interior contours of one or more designated features of the structure; and
determining the exterior contours of the floors as a minimum bounding box that encompasses the interior contours.

3. The method of claim 2, wherein the one or more designated features include at least one feature selected from the group consisting of (i) interior walls of the structure, (ii) exterior walls of the structure, (iii) stairwells within the structure, and (iv) elevator shafts within the structure.

4. The method of claim 2, further comprising aligning the exterior contours at least in part based on the interior contours.

5. The method of claim 1, wherein the plurality of images are raster images and wherein the method further comprises generating a plurality of dynamic images based on the plurality of images.

6. The method of claim 5, wherein generating the plurality of dynamic images includes:
classifying a plurality of pixels within each of the plurality of images as indicating the exterior contours; and
connecting the plurality of pixels to generate the plurality of dynamic images.

7. The method of claim 5, further comprising associating the plurality of dynamic images with the three-dimensional contour of the exterior of the structure.

8. The method of claim 5, further comprising extruding one or more features between the plurality of dynamic images to generate a three-dimensional representation of a plurality of floors of the structure.

9. The method of claim 5, further comprising extracting first coordinates of the structure from the three-dimensional map.

10. The method of claim 9, further comprising determining second coordinates for at least a portion of the plurality of dynamic images based on the first coordinates.

11. The method of claim 10, further comprising identifying a third subset of the plurality of images that depict site plans of the structure, wherein the second coordinates are determined at least in part based on the site plans of the structure.

12. The method of claim 10, wherein the first coordinates are georeferenced coordinates and wherein the second coordinates are determined in a local frame of reference for the structure.

13. The method of claim 1, wherein the three-dimensional map includes a plurality of pixels associated with a set of georeferenced coordinates.

14. A system comprising:
a processor; and
a memory storing instructions which, when executed by the processor, cause the processor to perform operations including:
receiving a plurality of images depicting sheets of a blueprint of a structure;
identifying, based on the plurality of images, exterior contours of floors of the structure and elevation contours of the structure;
identifying, based on the exterior contours and the elevation contours, a three-dimensional contour corresponding to the structure in a three-dimensional map of an area surrounding the structure; and
extracting, from the three-dimensional map, the three-dimensional contour of an exterior of the structure.

15. The system of claim 14, wherein identifying the exterior contours of the floors of the structure further comprises:
identifying, for each of the plurality of images, interior contours of one or more designated features of the structure; and
determining the exterior contours of the floors as a minimum bounding box that encompasses the interior contours.

16. The system of claim 15, wherein the one or more designated features include at least one feature selected from the group consisting of (i) interior walls of the structure, (ii) exterior walls of the structure, (iii) stairwells within the structure, and (iv) elevator shafts within the structure.

17. The system of claim 15, wherein the operations further comprise aligning the exterior contours at least in part based on the interior contours.

18. The system of claim 14, wherein the plurality of images are raster images and wherein the operations further comprise generating a plurality of dynamic images based on the plurality of images.

19. The system of claim 18, wherein generating the plurality of dynamic images includes:
classifying a plurality of pixels within each of the plurality of images as indicating the exterior contours; and
connecting the plurality of pixels to generate the plurality of dynamic images.

20. The system of claim 18, wherein the operations further comprise associating the plurality of dynamic images with the three-dimensional contour of the exterior of the structure.

* * * * *